(12) United States Patent
Hu et al.

(10) Patent No.: US 12,266,976 B2
(45) Date of Patent: Apr. 1, 2025

(54) CONSEQUENT-POLE MOTOR WITH ROTOR HAVING TWO LAYER PERMANENT MAGNETS

(71) Applicant: GREE ELECTRIC APPLIANCES, INC. OF ZHUHAI, Zhuhai (CN)

(72) Inventors: Yusheng Hu, Zhuhai (CN); Bin Chen, Zhuhai (CN); Quanfeng Li, Zhuhai (CN); Jinfei Shi, Zhuhai (CN)

(73) Assignee: GREE ELECTRIC APPLIANCES, INC. OF ZHUHAI, Zhuhai (CN)

( * ) Notice: Subject to any disclaimer, the term of this patent is extended or adjusted under 35 U.S.C. 154(b) by 699 days.

(21) Appl. No.: 17/125,014

(22) Filed: Dec. 17, 2020

(65) Prior Publication Data

US 2021/0104924 A1    Apr. 8, 2021

Related U.S. Application Data

(63) Continuation of application No. PCT/CN2018/122833, filed on Dec. 21, 2018.

(30) Foreign Application Priority Data

Jul. 17, 2018   (CN) .......................... 201810784378.3

(51) Int. Cl.
  *H02K 1/27* (2022.01)
  *H02K 1/276* (2022.01)
  *H02K 21/14* (2006.01)

(52) U.S. Cl.
  CPC ............. *H02K 1/276* (2013.01); *H02K 21/14* (2013.01); *H02K 2213/03* (2013.01)

(58) Field of Classification Search
  CPC ............ H02K 1/26; H02K 1/246; H02K 3/04; H02K 3/12; H02K 3/15; H02K 19/103;
  (Continued)

(56) References Cited

U.S. PATENT DOCUMENTS 2,913,607 A * 11/1959 Douglas ................. H02K 19/14
 310/216.107
6,121,706 A * 9/2000 Nashiki .................. H02K 1/246
 310/216.106

(Continued)

FOREIGN PATENT DOCUMENTS

CN   104600939 A    5/2015
CN   105978198 A *  9/2016   ............... H02K 1/02
(Continued)

OTHER PUBLICATIONS

CN105978198A English Translation.*
(Continued)

*Primary Examiner* — Maged M Almawri
(74) *Attorney, Agent, or Firm* — Westbridge IP LLC

(57) ABSTRACT

A consequent-pole motor comprises a rotor and a stator sleeved outside the rotor. The rotor comprises a plurality of permanent magnetic poles evenly spaced along a circumferential direction of the rotor. A plurality of stator teeth is disposed on an inner periphery of the stator along a circumferential direction of the inner periphery. A permanent magnetic pole of the rotor comprises a first permanent magnet mounting groove and a second permanent magnet mounting groove disposed sequentially from outside to inside along a radial direction of the rotor. A first layer permanent magnet is disposed in the first permanent magnet mounting groove, and a second layer permanent magnet is disposed in the second permanent magnet mounting groove. According to the motor, permanent magnets distributed in multiple layers are used, so that the magnetic resistance torque of the motor can be improved, which may increase reluctance torque, thereby increasing electromagnetic torque.

20 Claims, 9 Drawing Sheets

(58) Field of Classification Search
CPC ...... H02K 17/16; H02K 17/165; H02K 17/18; H02K 17/185; H02K 17/20; H02K 17/205; H02K 1/27; H02K 2213/03; H02K 1/276; H02K 1/2766; H02K 1/2773; H02K 1/28; H02K 1/2706; H02K 1/2713; H02K 1/272; H02K 1/2726; H02K 1/2733; H02K 29/03
USPC ................ 310/197, 156.83, 156.01–156.84, 310/211–213, 125, 156.01–156.57, 156.11
See application file for complete search history.

(56) References Cited

U.S. PATENT DOCUMENTS

| | | | | |
|---|---|---|---|---|
| 6,274,960 | B1* | 8/2001 | Sakai | H02K 1/246 310/168 |
| 6,630,762 | B2* | 10/2003 | Naito | H02K 15/03 310/156.56 |
| 6,794,784 | B2* | 9/2004 | Takahashi | H02K 1/246 310/156.56 |
| 6,815,859 | B2* | 11/2004 | Sakuma | H02K 21/14 310/156.53 |
| 7,038,345 | B2* | 5/2006 | Fratta | H02K 21/16 310/156.53 |
| 7,459,821 | B2* | 12/2008 | Ho Cheong | H02K 15/03 310/156.56 |
| 7,498,708 | B2* | 3/2009 | Brown | H02K 1/276 310/156.08 |
| 10,211,690 | B2* | 2/2019 | Laldin | H02K 1/2706 |
| 10,491,063 | B2* | 11/2019 | Koechlin | H02K 1/2766 |
| 10,491,064 | B2* | 11/2019 | Tang | H02K 21/14 |
| 11,418,098 | B2* | 8/2022 | Yen | H02K 15/024 |
| 11,689,071 | B2* | 6/2023 | Hu | B60K 1/00 310/156.56 |
| 2003/0164655 | A1* | 9/2003 | Biais | H02K 1/2726 310/156.56 |
| 2006/0043812 | A1* | 3/2006 | Cheong | H02K 1/246 310/156.53 |
| 2007/0096579 | A1* | 5/2007 | Aydin | H02K 1/278 310/156.56 |
| 2007/0228862 | A1* | 10/2007 | Welchko | H02K 1/2766 310/156.53 |
| 2008/0018190 | A1* | 1/2008 | Takahata | H02K 1/276 310/156.55 |
| 2009/0224624 | A1* | 9/2009 | Kumar | H02K 1/246 310/156.53 |
| 2010/0308680 | A1* | 12/2010 | Yamada | H02K 1/2746 310/156.54 |
| 2012/0200186 | A1* | 8/2012 | Sano | H02K 1/2766 310/156.01 |
| 2013/0313936 | A1* | 11/2013 | Shibata | H02K 1/2746 310/156.43 |
| 2014/0346911 | A1* | 11/2014 | Tsuchida | H02K 1/246 310/156.53 |
| 2015/0115758 | A1* | 4/2015 | Koka | H02K 21/14 318/139 |
| 2015/0229170 | A1* | 8/2015 | Koechlin | H02K 1/2766 310/156.53 |
| 2016/0285327 | A1* | 9/2016 | Sasaki | H02K 1/246 |
| 2016/0301271 | A1* | 10/2016 | Saito | H02K 1/246 |
| 2017/0144693 | A1* | 5/2017 | Okubo | B62D 5/0466 |
| 2017/0160540 | A1* | 6/2017 | Giusti | H10N 30/2044 |
| 2017/0187257 | A1* | 6/2017 | Liu | H02K 1/2766 |
| 2017/0317540 | A1* | 11/2017 | Laldin | H02K 1/2766 |
| 2020/0136451 | A1* | 4/2020 | Zeichfüssl | F03D 9/25 |
| 2020/0185990 | A1* | 6/2020 | Soma | H02K 1/2766 |
| 2023/0198322 | A1* | 6/2023 | Tremelling | H02K 1/276 310/46 |

FOREIGN PATENT DOCUMENTS

| | | |
|---|---|---|
| CN | 107659101 A | 2/2018 |
| CN | 108777520 A | 11/2018 |
| CN | 208423978 U | 1/2019 |

OTHER PUBLICATIONS

First Office Action in counterpart Chinese Patent Application No. 201810784378.3, dated May 29, 2019.
International Search Report in corresponding PCT Application No. PCT/CN2018/122833, dated Mar. 28, 2019.
Written Opinion in corresponding PCT Application No. PCT/CN2018/122833, dated Mar. 28, 2019.

* cited by examiner

CONSEQUENT-POLE MOTOR WITH ROTOR HAVING TWO LAYER PERMANENT MAGNETS

CROSS-REFERENCE TO RELATED APPLICATIONS

The present application is a continuation application of International Application No. PCT/CN2018/122833 filed on Dec. 21, 2018, which claims priority to Chinese patent application No. 2018107884378.3 filed on Jul. 17, 2018. Both applications are incorporated herein by reference in their entireties.

TECHNICAL FIELD

The present application relates to the field of motor technologies, in particular to a consequent-pole motor.

BACKGROUND

A traditional permanent magnet motor, taking an eight-pole permanent magnet motor as an example, has eight permanent magnets arranged in a direction of rotation around a center of the rotor, and adjacent permanent magnets have different magnetization directions. A consequent-pole permanent magnet synchronous motor has only four permanent magnets, which are equally distributed along a circumference, and adjacent permanent magnets have the same length in their magnetization directions. A permanent magnet mounting groove is called a permanent magnetic pole. A soft magnetic material between two permanent magnet mounting grooves is magnetized by the permanent magnetic pole to have an opposite polarity to the permanent magnetic pole, so it is called a consequent-pole permanent magnet motor. The usage of permanent magnets can be significantly reduced by using this consequent-pole permanent magnet motor.

However, magnetic lines of a pair of poles of a traditional consequent-pole motor only pass through one permanent magnet. Although a thickness of the single permanent magnet is thicker than that of a conventional motor, there are two permanent magnets in a magnetic line loop of the conventional motor, so the thickness of the permanent magnet in a d-axis magnetic circuit of the consequent-pole motor is significantly smaller than an equivalent thickness of the permanent magnets in a d-axis magnetic circuit of the conventional motor. Therefore, a reluctance of the d-axis magnetic circuit of the consequent-pole motor is small, and an inductance of the d-axis is large resulting in a small difference between inductances of a q-axis and the d-axis, which leads to a smaller reluctance torque, and limits an increase of an electromagnetic torque.

SUMMARY

A purpose of the present application is to provide a consequent-pole motor to solve a problem that a traditional consequent-pole motor has a small reluctance torque and limits an increase of an electromagnetic torque.

In order to achieve the above purpose, an embodiment of the present application provides a consequent-pole motor, which includes: a rotor including a plurality of permanent magnetic poles evenly spaced along a circumferential direction of the rotor; and a stator sleeved outside the rotor. A plurality of stator teeth are disposed on an inner periphery of the stator along a circumferential direction of the inner periphery. A permanent magnetic pole of the rotor includes a first permanent magnet mounting groove and a second permanent magnet mounting groove disposed sequentially from outside to inside along a radial direction of the rotor. A first layer permanent magnet is disposed in the first permanent magnet mounting groove, and a second layer permanent magnet is disposed in the second permanent magnet mounting groove.

According to the consequent-pole motor provided by an embodiment of the present application, permanent magnets distributed in multiple layers are used, which may increase the reluctance torque of the motor, thereby increasing the electromagnetic torque of the motor.

In addition, the consequent-pole motor according to the above embodiment of the present application may also have the following additional technical features.

In an embodiment of the present application, the number of the stator teeth is z and the number of the permanent magnet poles is p, the first permanent magnet mounting groove of the permanent magnet pole is corresponding to a first area of the inner periphery of the stator, and the number of the stator teeth in the first area is $z/4p+1$.

In this embodiment, a greater permanent magnet torque can be produced by the first layer permanent magnet, and a q-axis magnetic circuit of a magnetic conduction channel between the first permanent magnet mounting groove and the second permanent magnet mounting groove has a greater inductance, and thus the reluctance torque is increased.

In an embodiment of the present application, the number of the stator teeth is z and the number of the permanent magnet poles is p, the second permanent magnet mounting groove of the permanent magnet pole is corresponding to a second area of the inner periphery of the stator, and the number of the stator teeth in the second area is $z/2p+2$.

In this embodiment, the electromagnetic torque can be further improved.

In an embodiment of the present application, two tooth tips are respectively disposed on both sides of one end of each of the stator teeth close to the rotor, one side of the second permanent magnet mounting groove is corresponding to an outer tooth tip of a stator tooth on one side of the second area, and the other side of the second permanent magnet mounting groove is corresponding to an outer tooth tip of a stator tooth on the other side of the second area.

In this embodiment, the electromagnetic torque can be maximized.

In an embodiment of the present application, a thickness of the first layer permanent magnet is t1, a thickness of the second layer permanent magnet is t2, and $1.3 < t1/t2 < 1.7$.

In this embodiment, on a premise of meeting an anti-demagnetization ability, a maximum electromagnetic torque is provided by a minimum amount of permanent magnet.

In an embodiment of the present application, on a section perpendicular to an axis of the rotor, both sections of the first permanent magnet mounting groove and the second permanent magnet mounting groove include a first segment, a second segment and a third segment connected in sequence, the first segment and the third segment are symmetrical about a midline of the second segment, and midlines of the second segments of the first permanent magnet mounting groove and the second segment of the second permanent magnet mounting groove are coincident and intersect the axis of the rotor. The first layer permanent magnet is disposed in the second segment of the first permanent magnet mounting groove, and a magnetic insulating material is provided in the first segment and the third segment of the first permanent magnet mounting groove. The second layer permanent magnet is provided in the second segment of the second permanent magnet mounting groove, and a magnetic insulating material is provided in the first segment and the third segment of the second permanent magnet mounting groove.

In this embodiment, the amount of permanent magnet is reduced, and an equivalent thickness of permanent magnet remains unchanged.

In an embodiment of the present application, a thickness of the first layer permanent magnet is t1, a thickness of the second layer permanent magnet is t2, a distance between one end of the first segment of the second permanent magnet mounting groove close to an outer periphery of the rotor and one end of the third segment of the second permanent magnet mounting groove close to the outer periphery of the rotor is w2, and 4<w2/(t1+t2)<8.

In this embodiment, an appropriate ratio of an equivalent magnetic flux area to the equivalent thickness of permanent magnet is ensured, the permanent magnets are fully utilized, and a cost is reduced.

In an embodiment of the present application, a minimum distance between the first segment of the first permanent magnet mounting groove and an outer periphery of the rotor is t3, a minimum distance between the third segment of the first permanent magnet mounting groove and the outer periphery of the rotor is t3, a minimum distance between the first segment of the second permanent magnet mounting groove and the outer periphery of the rotor is t4, a minimum distance between the third segment of the second permanent magnet mounting groove and the outer periphery of the rotor is t4, and t3 t4.

In this embodiment, an anti-demagnetization ability of a single sheet of the motor is improved.

In an embodiment of the present application, a minimum distance between a center of the first layer permanent magnet and an outer periphery of the rotor is tm1, a distance between one end of the first segment of the first permanent magnet mounting groove close to an outer periphery of the rotor and one end of the third segment of the first permanent magnet mounting groove close to the outer periphery of the rotor is w1, a distance between one end of the first segment of the second permanent magnet mounting groove close to the outer periphery of the rotor and one end of the third segment of the second permanent magnet mounting groove close to the outer periphery of the rotor is w2, and $(2\times tm1)/(w2-w1)=(0.5\sim1)$.

In this embodiment, a ratio of the permanent magnet torque to the reluctance torque is appropriate, which increases a synthetic torque.

In an embodiment of the present application, a distance between one end of the first segment of the first permanent magnet mounting groove close to an outer periphery of the rotor and one end of the third segment of the first permanent magnet mounting groove close to the outer periphery of the rotor is w1, a distance between one end of the first segment of the second permanent magnet mounting groove close to the outer periphery of the rotor and one end of the third segment of the second permanent magnet mounting groove close to the outer periphery of the rotor is w2, and $1.15<w2/w1<2.1$.

In this embodiment, the sizes of w1 and w2 are correlated, which ensures that the ratio of the permanent magnet torque to the reluctance torque in the electromagnetic torque is appropriate, and thus the synthetic torque is increased.

In an embodiment of the present application, the first segment of one of two adjacent second permanent magnet mounting grooves is adjacent to the third segment of the other, a distance between one end of the first segment of one of the two adjacent second permanent magnet mounting grooves close to an outer periphery of the rotor and one end of the third segment of the other close to the outer periphery of the rotor is w3, a width of the second layer permanent magnet is wm2, and $1.8<wm2/w3<2.7$.

In this embodiment, the electromagnetic torque may be maximized and an extra iron loss due to local magnetic saturation may be reduced.

In an embodiment of the present application, the first layer permanent magnet is a permanent magnet with low remanence and low coercivity, the second layer permanent magnet is a permanent magnet with high remanence and high coercivity.

In this embodiment, on a premise of ensuring performances of the motor and the anti-demagnetization ability, the cost is minimized.

In an embodiment of the present application, at least one of the first layer permanent magnet and the second layer permanent magnet comprises a plurality of permanent magnet blocks.

In this embodiment, the plurality of permanent magnet blocks may simplify a processing and installation of permanent magnets.

In an embodiment of the present application, on a section perpendicular to an axis of the rotor, a section of the first layer permanent magnet is in a shape of V or in a shape of U.

In this embodiment, a magnetic flux area of the permanent magnet may be increased.

In an embodiment of the present application, on a section perpendicular to an axis of the rotor, a section of the second layer permanent magnet is in a shape of V or in a shape of line.

In this embodiment, a magnetic flux area of the permanent magnet may be increased.

The advantages of the above additional aspects will be partly given in the following description, some of the advantages will become apparent from the following description, or be learned through the practice of the present application.

DETAILED DESCRIPTION OF THE EMBODIMENTS

The principles and features of the present application will be described below with reference to the accompanying drawings, the embodiments cited are only used to explain the present application, and are not used to limit the scope of the present application.

Figure 1:
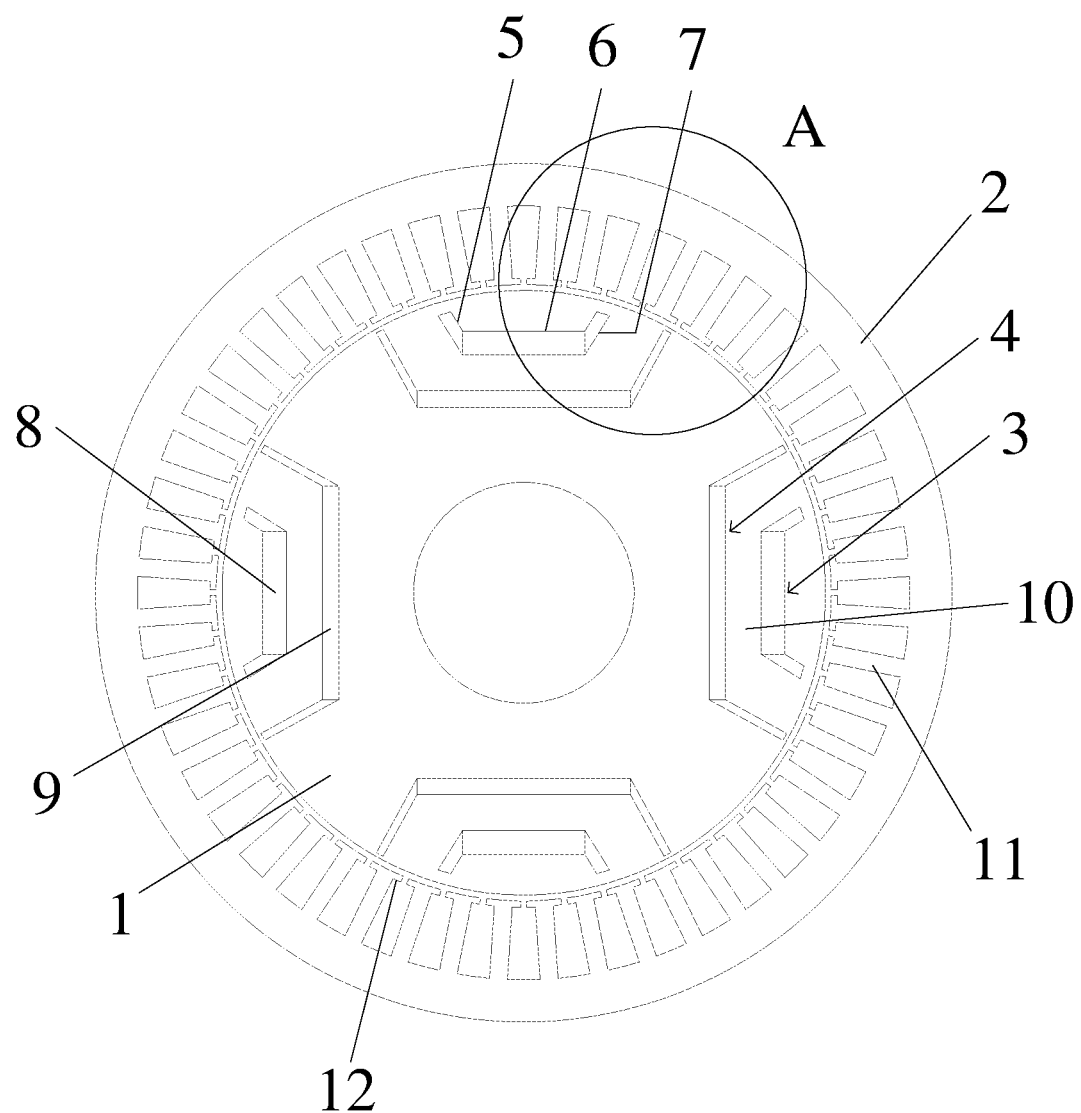
FIG. 1 is a schematic structural diagram illustrating a consequent-pole motor according to an embodiment of the present application.
Figure 2:
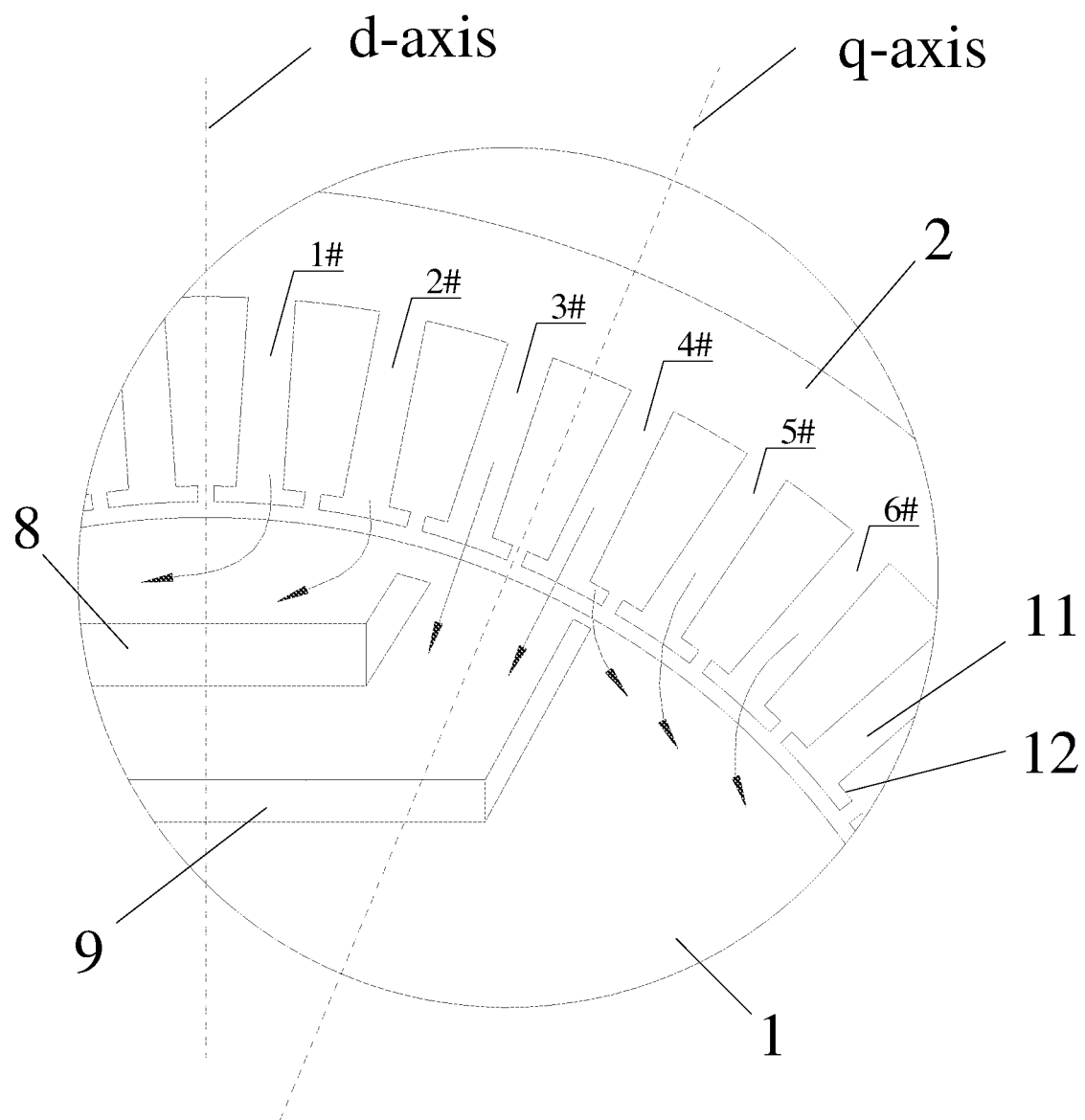
FIG. 2 is an enlarged view illustrating the part A of FIG. 1.
Figure 3:
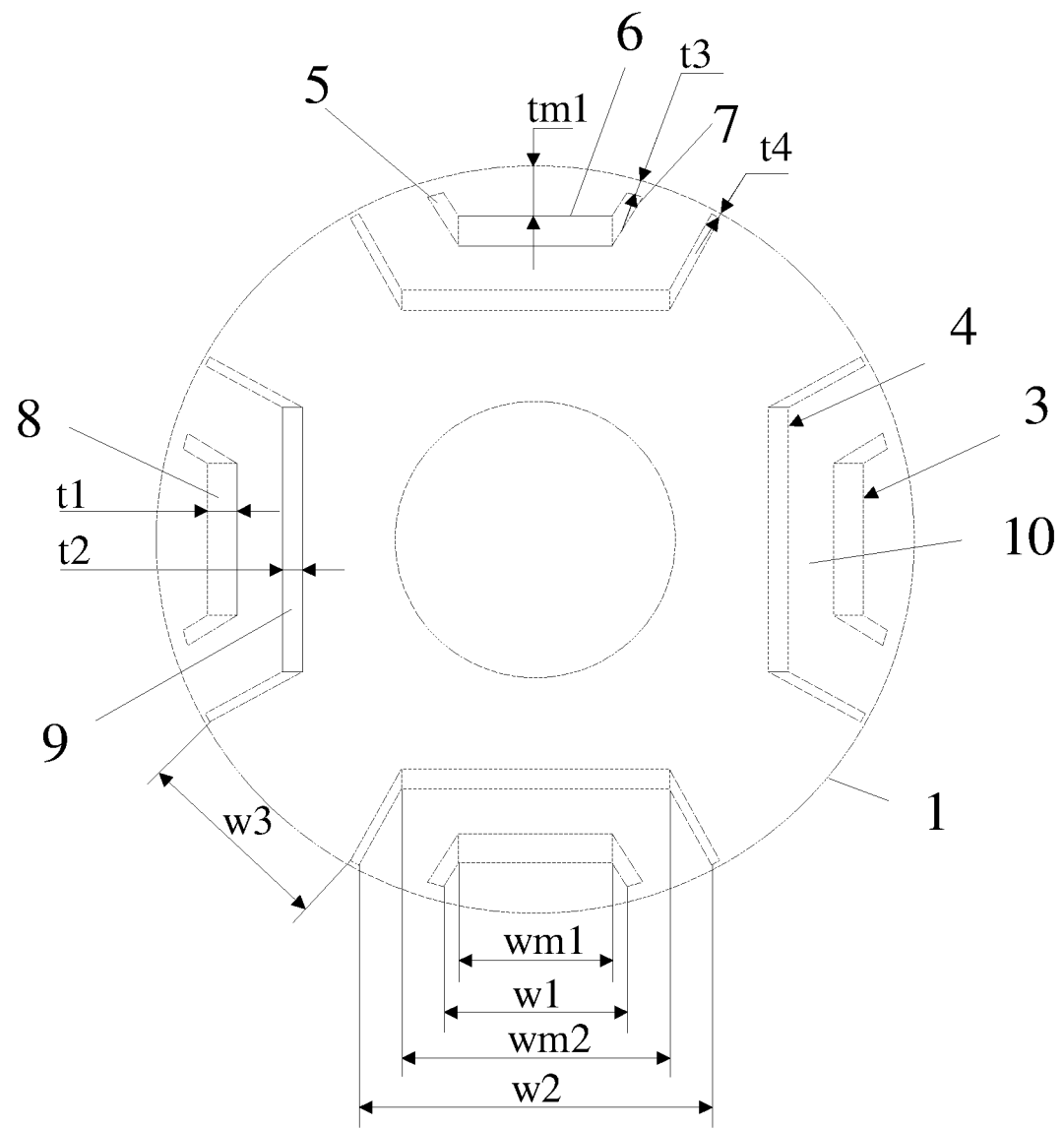
FIG. 3 is a schematic structural diagram illustrating a rotor according to an embodiment of the present application.

As shown in FIGS. 1-3, the embodiments provide a consequent-pole motor, which includes a rotor 1 and a stator 2 sleeved outside the rotor 1. The rotor 1 includes a plurality of permanent magnetic poles evenly spaced along a circumferential direction of the rotor 1. A plurality of stator teeth 11 are disposed on an inner periphery of the stator 2 along a circumferential direction of the inner periphery.

In this embodiment, the permanent magnet poles of the rotor 1 are improved. As shown in FIGS. 1 and 3, the permanent magnetic pole of the rotor 1 includes a first permanent magnet mounting groove 3 and a second permanent magnet mounting groove 4 disposed sequentially from outside to inside along a radial direction of the rotor 1, and a distance between the first permanent magnet mounting groove 3 and an outer periphery of the rotor 1 is smaller than a distance between the second permanent magnet mounting groove 4 and the outer periphery of the rotor 1. There is a magnetic conduction channel 10 between the first permanent magnet mounting groove 3 and the second permanent magnet mounting groove 4. A first layer permanent magnet 8 is disposed in the first permanent magnet mounting groove 3, and a second layer permanent magnet 9 is disposed in the second permanent magnet mounting groove 4. A reluctance torque of the motor is increased by multi-layer distributed permanent magnets of the above structure, and an electromagnetic torque of the motor is increased.

Figure 4:
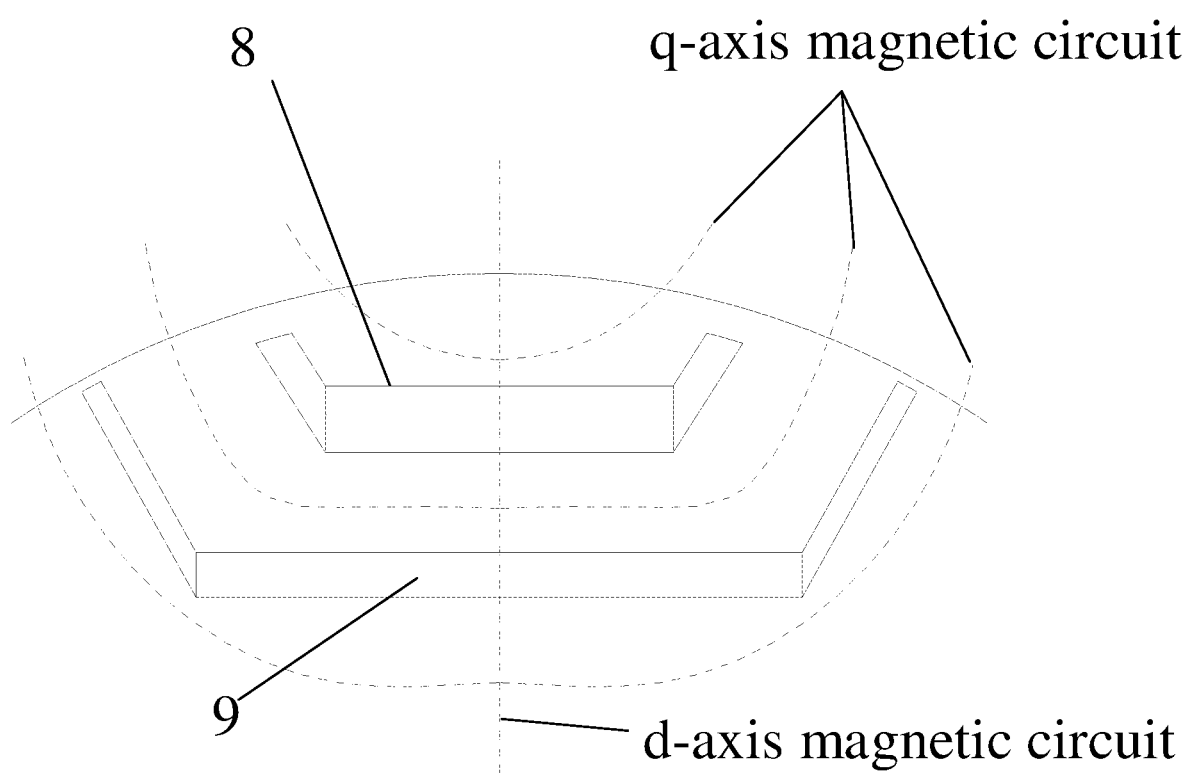
FIG. 4 is a schematic diagram illustrating magnetic circuits of a d-axis and a q-axis of a rotor according to an embodiment of the present application.
Figure 7:
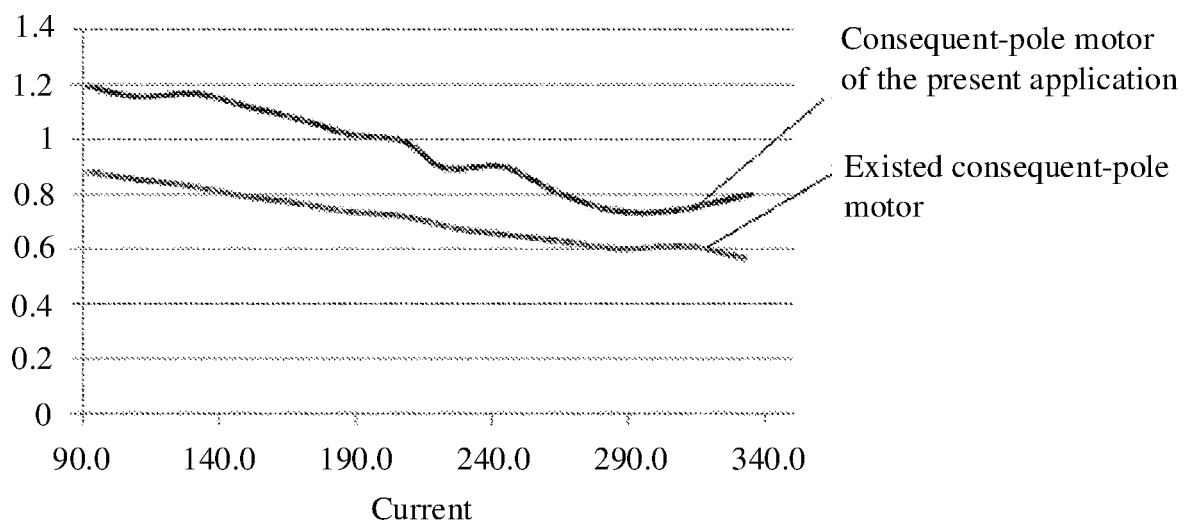
FIG. 7 is a comparison diagram illustrating q-axis inductances of a consequent-pole motor according to an embodiment of the present application and an existed motor.

Specifically, the multi-layer distributed permanent magnets can significantly increase a q-axis inductance of the motor. A q-axis magnetic circuit of the motor is shown in FIG. 4. The consequent-pole motor of this embodiment provides three obvious magnetic line channels, which make it easier for q-axis magnetic lines to pass through, a reluctance on a q-axis magnetic circuit is reduced, and the q-axis inductance is greater. Compared with a conventional consequent-pole motor, although the permanent magnet through which a d-axis magnetic circuit passes, is changed from one layer to two layers, in the consequent-pole motor of this embodiment, an equivalent thickness of permanent magnet is basically unchanged because the amount of permanent magnet is not changed, and an inductance of the d-axis magnetic circuit remains basically unchanged. However, since the magnetic conduction channel 10 is formed between the layers, the reluctance of the q-axis magnetic circuit is significantly reduced, the q-axis inductance is increased, a difference between inductances of the quadrature-direct axis magnetic circuits is increased, and thus the reluctance torque is better utilized. FIG. 7 is a comparison diagram illustrating q-axis inductances of a consequent-pole motor according to an embodiment of the present application and an existed motor. With reference to the accompanying drawings, the consequent-pole motor of this embodiment can significantly increase the q-axis inductance of the motor.

A structure of the rotor 1 of the embodiments of the present application is further described in the following.

As shown in FIG. 3, on a section perpendicular to an axis of the rotor 1, both sections of the first permanent magnet mounting groove 3 and the second permanent magnet mounting groove 4 include a first segment 5, a second segment 6 and a third segment 7 connected in sequence. The first segment 5 and the third segment 7 are symmetrical about a midline of the second segment 6, and midlines of the second segments 6 of the first permanent magnet mounting groove 3 and the second segment 6 of the second permanent magnet mounting groove 4 are coincident and intersect the axis of the rotor 1. The first segment 5 and the third segment 7 have a shape feature of extending to the outer periphery of the rotor 1.

Specifically, in this embodiment, the first layer permanent magnet 8 is disposed in the second segment 6 of the first permanent magnet mounting groove 3. A magnetic insulating material is provided in the first segment 5 and the third segment 7 of the first permanent magnet mounting groove 3. The second layer permanent magnet 9 is provided in the second segment 6 of the second permanent magnet mounting groove 4. A magnetic insulating material is provided in the first segment 5 and the third segment 7 of the second permanent magnet mounting groove 4. The magnetic insulating material is non-magnetic material. Compared with a conventional consequent-pole motor, although the permanent magnet through which the d-axis magnetic circuit passes, is changed from one layer to two layers, in the consequent-pole motor of this embodiment, the amount of permanent magnet is not changed by disposing the magnetic insulating material in the first segment 5 and the third segment 7, the equivalent thickness of permanent magnet is also basically unchanged, and the inductance of the d-axis magnetic circuit remains basically unchanged. However, due to the formation of the magnetic conduction channel 10 between the layers, the reluctance of the q-axis magnetic circuit is significantly reduced, the q-axis inductance is increased, the difference between inductances of the quadrature-direct axis magnetic circuits is increased, and the reluctance torque is better utilized.

Advantageously, a thickness of the first layer permanent magnet 8 is t1, a thickness of the second layer permanent magnet 9 is t2, and $1.3<t1/t2<1.7$. The above structure is adopted, because a demagnetization magnetic field applied from the outside directly acts on the first layer permanent magnet 8, the thicker the thickness of the permanent magnet, the stronger the anti-demagnetization ability, and the anti-demagnetization ability may be effectively improved by increasing the thickness of the first layer permanent magnet 8. However, when the thickness of t1 exceeds a certain range, continuing to increase t1 has no significant effect on the increase of the anti-demagnetization ability, but will make the cost of permanent magnets rise sharply. In order to control the cost of permanent magnets, the thickness t2 of the second layer permanent magnet 9 is inevitably reduced. Although the reduction of t2 has little effect on the anti-demagnetization ability, a decrease of a working point of the permanent magnets may make the electromagnetic torque decrease sharply.

Therefore, the inventor has proved through a large number of experiments that when $1.3<t1/t2<1.7$, the ratio of t1 to t2 is more appropriate. On a premise of meeting the anti-demagnetization ability, a maximum electromagnetic torque is provided by the least amount of permanent magnet.

More advantageously, this embodiment also defines a ratio between a width of a permanent magnet pole and an equivalent thickness of the two layers of permanent magnets. As shown in FIG. 3, the thickness of the first layer permanent magnet 8 is t1, the thickness of the second layer permanent magnet 9 is t2, a distance between one end of the first segment 5 of the second permanent magnet mounting groove close to an outer periphery of the rotor 1 and one end of the third segment 7 of the second permanent magnet mounting groove close to the outer periphery of the rotor 1 is w2, and $4<w2/(t1+t2)<8$.

Specifically, w2 represents the width of the permanent magnet pole, (t1+t2) represents the equivalent thickness of the two-layers of permanent magnets, and w2/(t1+t2) represents a slenderness ratio of the permanent magnets in the rotor 1 of the present application. When the slenderness ratio is increased, a magnetic flux area of the permanent magnets is increased, more magnetic lines will be generated, and the electromagnetic torque may be increased. However, a reduction of the equivalent thickness indicates that the overall anti-demagnetization ability of the permanent magnets is weakened. When the slenderness ratio is decreased, the effect is opposite. Therefore, the inventor used a large number of experiments to correlate w2 with t1 and t2. The experiments proved that when $4<w2/(t1+t2)<8$, an appropriate ratio of the equivalent magnetic flux area to the equivalent thickness of permanent magnet is ensured, the permanent magnets are fully utilized, and a cost is reduced.

As shown in FIG. 3, in this embodiment, a minimum distance between the first segment 5 of the first permanent magnet mounting groove 3 and an outer periphery of the rotor 1 is t3, a minimum distance between the third segment 7 of the first permanent magnet mounting groove 3 and the outer periphery of the rotor 1 is t3, a minimum distance between the first segment 5 of the second permanent magnet mounting groove 4 and the outer periphery of the rotor 1 is t4, a minimum distance between the third segment 7 of the second permanent magnet mounting groove 4 and the outer periphery of the rotor 1 is t4, and t3 t4.

In the above structure, a magnetic bridge with a width of t3, is formed between the first segment 5 of the first permanent magnet mounting groove 3 and the outer periphery of the rotor 1, and formed between the third segment 7 of the first permanent magnet mounting groove 3 and the outer periphery of the rotor 1. A magnetic bridge with a width of t4, is formed between the first segment 5 of the second permanent magnet mounting groove 4 and the outer periphery of the rotor 1, and formed between the third segment 7 of the second permanent magnet mounting groove 4 and the outer periphery of the rotor 1, and $t3 \geq t4$. In this way, magnetic flux leakage at the ends of the first layer permanent magnet 8 is increased, and a permanent magnet torque is reduced. However, since magnetic lines of an armature can easily pass through the magnetic bridges and increase the reluctance torque, a total electromagnetic torque may be not reduced. The first layer permanent magnet 8 is more prone to irreversible demagnetization than the second layer permanent magnet 9, which affects performances of the motor. As the magnetic flux leakage at the ends of the first layer permanent magnet 8 is increased, an anti-demagnetization ability of a single sheet of the motor is improved.

As shown in FIG. 3, in this embodiment, a minimum distance between a center of the first layer permanent magnet 8 and an outer periphery of the rotor 1 is tm1, a distance between one end of the first segment 5 of the first permanent magnet mounting groove close to an outer periphery of the rotor 1 and one end of the third segment 7 of the first permanent magnet mounting groove close to the outer periphery of the rotor 1 is w1, a distance between one end of the first segment 5 of the second permanent magnet mounting groove close to the outer periphery of the rotor 1 and one end of the third segment 7 of the second permanent magnet mounting groove close to the outer periphery of the rotor 1 is w2, and $(2 \times tm1)/(w2-w1)=(0.5\sim1)$.

In combination with the above structure, the inventor has proved through a large number of experiments that a ratio of the permanent magnet torque to the reluctance torque is appropriate and a synthetic torque may be maximized, when $(2 \times tm1)/(w2-w1)=(0.5\sim1)$. The magnetic lines within the magnetic conduction channel 10 includes magnetic lines of the armature, magnetic lines generated by the second layer permanent magnet 9, and magnetic lines generated by the first layer permanent magnet 8. Therefore, there are more magnetic lines distributed in the magnetic conduction channel 10. Studies show that a width of the magnetic conduction channel 10 can be roughly expressed as $(w2-w1)/2$. When $2tm1/(w2-w1)<0.5$, the magnetic lines in the magnetic conduction channel 10 are sparsely distributed, but the magnetic lines outside the first permanent magnet mounting groove 3 are densely distributed, causing local magnetic saturation, and the permanent magnet torque generated by the first layer permanent magnet 8 is reduced. Because the magnetic lines distributed in the magnetic conduction channel 10 under normal circumstances are more than those outside the first permanent magnet mounting groove 3, when $2tm1/(w2-w1)>1$, the magnetic conduction channel 10 has a higher degree of magnetic saturation, and the reluctance torque is reduced.

As shown in FIG. 3, in this embodiment, a distance between one end of the first segment of the first permanent magnet mounting groove close to an outer periphery of the rotor and one end of the third segment of the first permanent magnet mounting groove close to the outer periphery of the rotor is w1, a distance between one end of the first segment of the second permanent magnet mounting groove close to the outer periphery of the rotor and one end of the third segment of the second permanent magnet mounting groove close to the outer periphery of the rotor is w2, and $1.15<w2/w1<2.1$.

The above structure is designed because the inventor considers the following contents: the larger w1 is, the smaller the magnetic conduction channel 10 is, and an increment of the q-axis inductance of the motor is small, which is not conducive to an improvement of the reluctance torque. The smaller w1 is, the smaller the magnetic flux area provided by the permanent magnets is, and the permanent magnet torque in the electromagnetic torque is reduced. When a width of the magnetic conduction channel 10 is increased beyond a certain range, continuing to increase the width of the magnetic conduction channel 10 does not significantly increase the reluctance torque. The correlation between the sizes of w1 and w2, ensures that the ratio of the permanent magnet torque to the reluctance torque in the electromagnetic torque is appropriate, and thus the synthetic torque may be maximized.

As shown in FIG. 3, in this embodiment, the first segment of one of two adjacent second permanent magnet mounting grooves is adjacent to the third segment of the other, a distance between one end of the first segment of one of the two adjacent second permanent magnet mounting grooves close to an outer periphery of the rotor and one end of the third segment of the other close to the outer periphery of the rotor is w3, a width of the second layer permanent magnet is wm2, and 1.8<wm2/w3<2.7.

Figure 6:
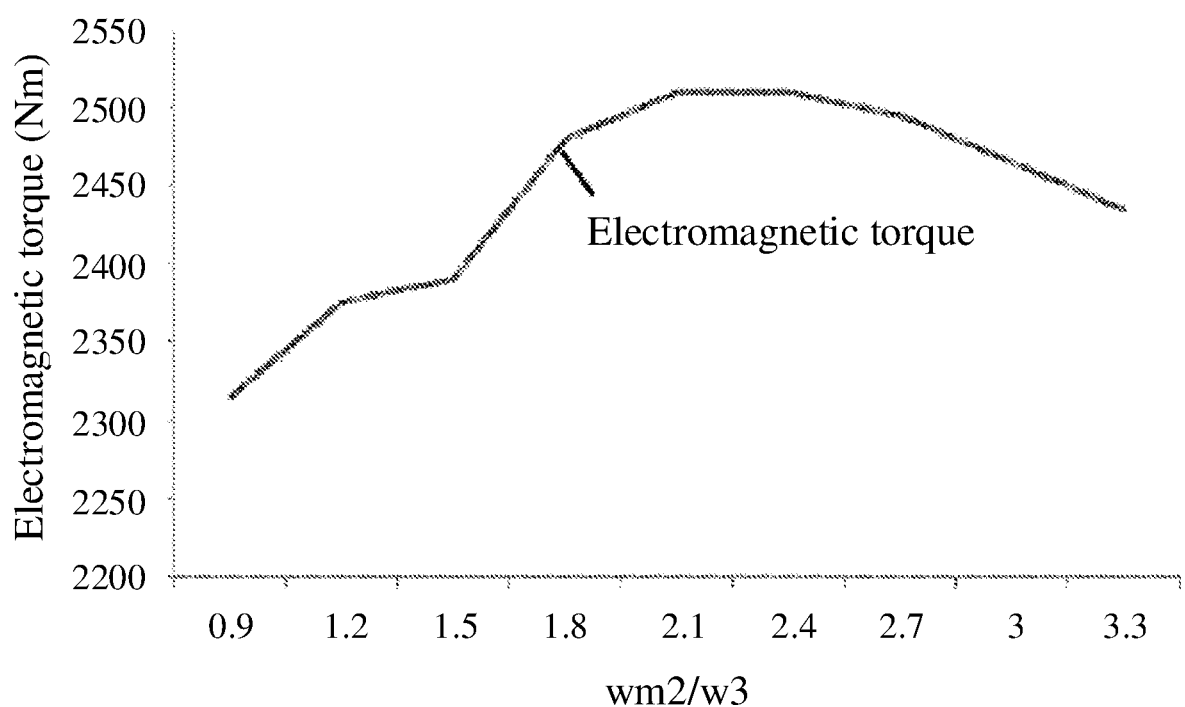
FIG. 6 is a schematic diagram illustrating states of an electromagnetic torque and a torque fluctuation changing with wm2/w3 according to an embodiment of the present application.

Specifically, the w3 represents a width of a consequent-pole, the magnetic lines of the first layer permanent magnet 8 of the permanent magnetic poles do not pass through the consequent-poles, the magnetic lines of the consequent-poles are only generated by the second layer permanent magnet 9. Therefore, compared with a single layer permanent magnet structure, the width of the consequent-pole motor with a double layer permanent magnet structure of the present application can be designed to be smaller, thus improving a larger installation area for the permanent magnets. But the inventor found that when the permanent magnet pole is designed too large, a consequent-pole area is too small and magnetism saturation may occur. Therefore, the inventor has proved through a large number of experiments that when 1.8<wm2/w3<2.7, the magnetic lines on the consequent-pole are evenly distributed, which may maximize the electromagnetic torque, and reduce an extra iron loss due to local magnetic saturation. As shown in FIG. 6, the influence of wm2/w3 on the electromagnetic torque can be more intuitively expressed.

Advantageously, in this embodiment, the first layer permanent magnet 8 is a permanent magnet with low remanence and low coercivity, the second layer permanent magnet 9 is a permanent magnet with high remanence and high coercivity. It should be noted that, "low remanence", "high remanence", "low coercivity" and "high coercivity" are all conventional technical terms well known to those skilled in the art. A ferrite permanent magnet material with a remanence of 0.5 Tesla and a coercivity of 300 kA/m is considered to be a material with low coercivity and low remanence. A rare earth permanent magnet material with a remanence of 1.2 Tesla and a coercivity of 1000 kA/m is considered to be a material with high coercivity and high remanence. The second layer permanent magnet 9 is made of a permanent magnet material with high remanence and high coercivity, and thus the cost is minimized, on a premise of ensuring performances of the motor and the anti-demagnetization ability.

In addition, this embodiment also improves the structure of the first layer permanent magnet 8 and the second layer permanent magnet 9. For example, the first layer permanent magnet 8 may include a plurality of permanent magnet blocks, and the second layer permanent magnet 9 may include a plurality of permanent magnet blocks. The plurality of permanent magnet blocks may simplify a processing and installation of permanent magnets.

For another example, on a section perpendicular to an axis of the rotor 1, a section of the first layer permanent magnet 8 is in a shape of V or in a shape of U, and a section of the second layer permanent magnet 9 is in a shape of V or in a shape of line, which increases the magnetic flux area of the permanent magnets.

Based on the above structures, the inventor also found that a relationship between a width of each layer permanent magnet and positions of tooth parts will affect the electromagnetic torque, so the inventor provides a further improvement including the width of permanent magnets and the positions of the tooth parts of the stator 2.

Specifically, in this embodiment, the number of the stator teeth 11 is z and the number of the permanent magnet poles is p. The first permanent magnet mounting groove 3 of the permanent magnet pole is corresponding to a first area of the inner periphery of the stator 2, and the number of the stator teeth 11 in the first area is z/4p+1. It should be noted that the first area of the above mentioned "the first permanent magnet mounting groove 3 of the permanent magnet pole is corresponding to a first area of the inner periphery of the stator 2" refers to a junction area between extension lines of two opposite sides of the first permanent magnet mounting groove 3 in the direction of the stator 2 and the inner periphery of the stator 2, and the number of the stator teeth 11 in the area is z/4p+1.

As shown in FIG. 2, the magnetic lines generated by the stator 2 enter the rotor 1 under normal conditions. Taking a motor with 48 slots and 8 poles as an example, z/4p+1=4, therefore, within a width range of the mounting groove of the first layer permanent magnet 8, there are 4 tooth parts of stator teeth 11. In FIG. 2, only half of the magnetic poles are shown, and the other half can be obtained symmetrically by a centerline (that is, the d-axis in FIG. 2) of the magnetic pole. The half tooth parts are 1 # and 2 # shown in FIG. 2, and directions of the magnetic lines on them are shown by arrows. When the mounting groove of the first layer permanent magnet 8 only corresponds to 1 #, then 2 #, 3 # and 4 # may face the magnetic conduction channel 10, and the number of the magnetic lines in the magnetic conduction channel 10 is increased. Although a size of an entrance (that is, a position between the third segment 7 of the mounting groove of the first layer permanent magnet 8 and the third segment 7 of the mounting groove of the second layer permanent magnet 9) of the magnetic conduction channel 10 will be increased due to a shortening of the mounting groove of the first layer permanent magnet 8, a size of a middle section (that is, between the second segment 6 of the mounting groove of the first layer permanent magnet 8 and the second segment 6 of the mounting groove of the second layer permanent magnet 9) of the magnetic conduction channel 10 will not be increased, and this middle section of the magnetic conduction channel 10 is highly saturated. Therefore, the increase of the q-axis inductance is not obvious, and the increase of the electromagnetic torque is not obvious. In addition, the width of the first layer magnetic conduction channel 10 is reduced, the magnetic lines generated by the first layer permanent magnet 8 are reduced, the permanent magnet torque generated by the first layer permanent magnet 8 is sharply reduced, and the synthetic electromagnetic torque is reduced. And, a proportion of magnetic flux leakage at both ends of the first layer permanent magnet 8 is increased correspondingly, and the utilization of permanent magnets is reduced.

When the first permanent magnet mounting groove 3 corresponds to three tooth parts, 1 #, 2 #, and 3 #, the area of the first layer permanent magnet 8 is increased, and thus the torque generated by the first layer permanent magnet 8 is increased. However, the size of the entrance of the magnetic conduction channel 10 is reduced, fewer magnetic lines can enter the magnetic conduction channel 10, the q-axis inductance is reduced, and the electromagnetic torque is reduced.

Figure 5:
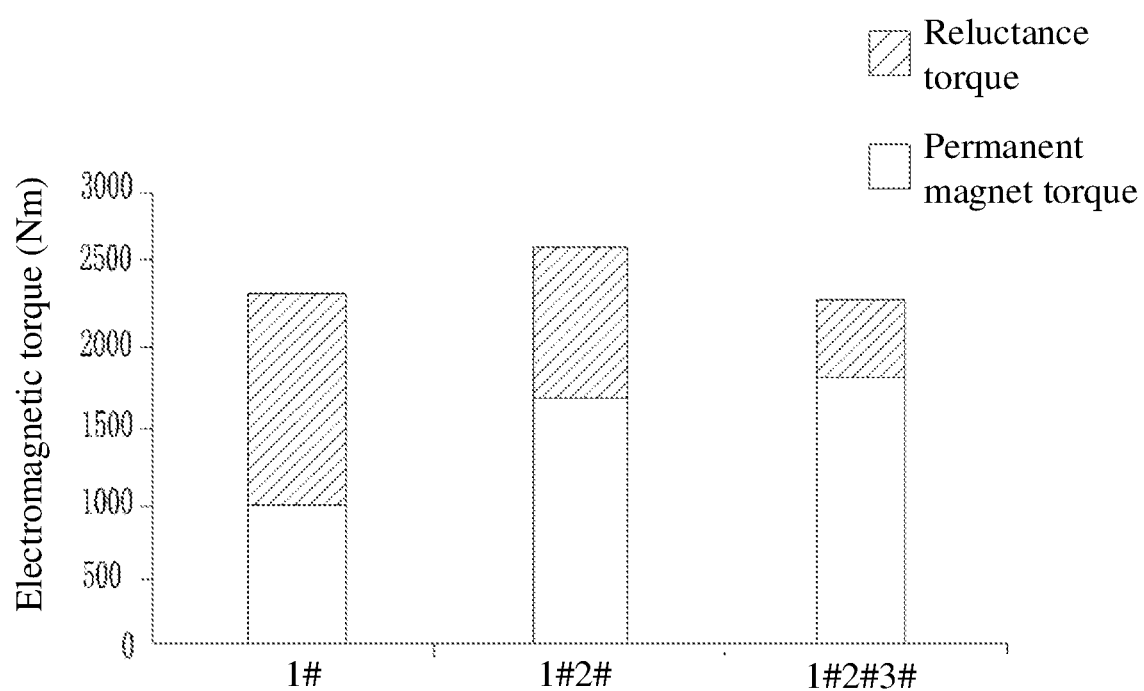
FIG. 5 is a schematic diagram illustrating an influence of stator teeth corresponding to a first permanent magnet mounting groove on an electromagnetic torque according to an embodiment of the present application.

The inventor has proved through experiments that when the number of the stator teeth 11 of the mounting groove of the first layer permanent magnet 8 is z/4p+1, the first layer permanent magnet 8 can generate a greater permanent magnet torque, the q-axis magnetic circuit including the magnetic conduction channel 10 has a larger inductance, and thus the reluctance torque is increased. The influence of the number of teeth on the component of the electromagnetic torque is shown in FIG. 5.

As shown in FIG. 2, in this embodiment, the second permanent magnet mounting groove 4 of the permanent magnet pole is corresponding to a second area of the inner periphery of the stator 2. According to the accompany drawings, the second area includes the above first area, and the number of the stator teeth 11 corresponding to the second area is z/2p+2. Advantageously, two tooth tips 12 are respectively disposed on both sides of one end of each of the stator teeth 11 close to the rotor 1, one side of the second permanent magnet mounting groove 4 is corresponding to an outer tooth tip 12 of a stator tooth 11 on one side of the second area, and the other side of the second permanent magnet mounting groove 4 is corresponding to an outer tooth tip 12 of a stator tooth 11 on the other side of the second area. The "corresponding" means that the extension lines on two sides (the two sides are specifically the first segment and the third segment mentioned above) of the permanent magnet mounting groove in the direction of the stator can intersect the teeth tip of the stator teeth.

The tooth parts of the stator teeth 11 corresponding to half of the second layer permanent magnet 9 are shown in FIG. 2, including 1 #~4 #. The mounting groove of the second layer permanent magnet 9 is aligned with the outer tooth tip 12 of the 4 # tooth, the direction of the magnetic lines on it is shown by an arrow, and the other half can be obtained symmetrically by the d-axis. The q-axis is a dividing line between adjacent magnetic poles of a conventional motor, and its two sides are different magnetic poles. But the design of this application is that the permanent magnet pole exceeds the q-axis. Because the magnetic lines in the central part of the tooth part 3 # of the stator teeth 11 and the tooth part 4 # of the stator teeth 11 located at both sides of the q-axis are parallel to each other, which can generate a positive torque by a linkage with the magnetic lines of the rotor 1 on the permanent magnet pole. However, the magnetic lines of the outer tooth tip 12 of the 4 # tooth point to the consequent-pole side, if the permanent magnet pole interacts with this part of the magnetic lines, a negative torque will be generated, thereby reducing the electromagnetic torque. In order to maximize the magnetic lines of the armature, which can form a linkage with the permanent magnet poles, without generating a negative torque, in this application, the third segment 7 of the mounting groove of the second layer permanent magnet 9 is designed to be aligned with the outer tooth tip 12 of the 4 # tooth to maximize the electromagnetic torque.

Figure 8:
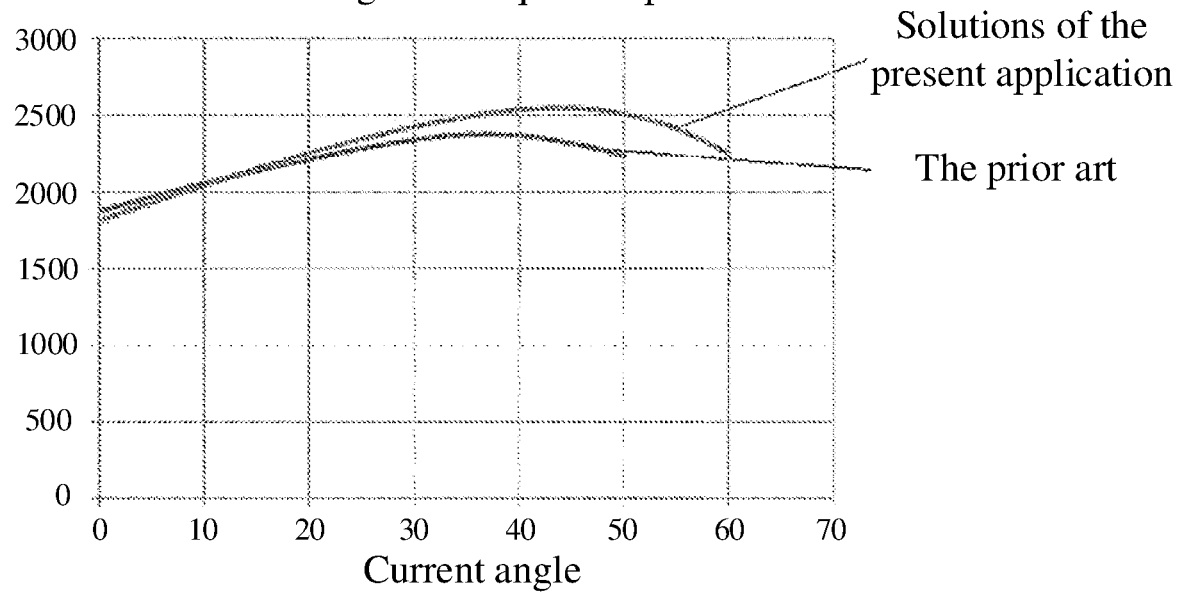
FIG. 8 is a graph illustrating changes of electromagnetic torques with current angle, of a consequent-pole motor according to an embodiment of the present application and an existed motor.
Figure 9:
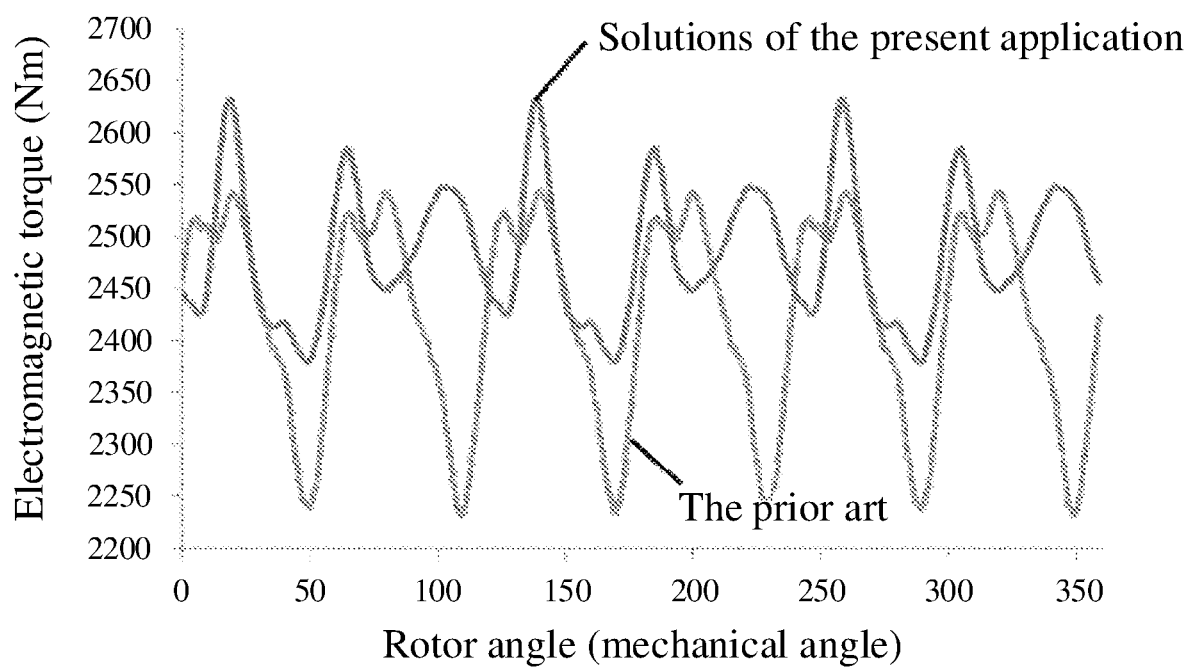
FIG. 9 is a graph illustrating torques of a consequent-pole motor according to an embodiment of the present application and an existed motor.

In combination with FIG. 8, it can be seen that a variation of the electromagnetic torque of the consequent-pole motor in this embodiment with current angle is significantly better than the prior art. In addition, as shown in FIG. 9, the torque of the consequent-pole motor of this embodiment is also significantly better than the prior art.

In the description of the present application, it should be understood that, the orientations or position relationships indicated by the terms "inner", "outer", "radial", "circumferential", "axial" and other terms are based on the orientations or position relationships shown in the accompany drawings, which is only for the convenience of describing the present application and simplifying the description, rather than indicating or implying that the pointed device must have a specific orientation and be constructed and operated in a specific orientation, and therefore cannot be understood as limitations on the present application.

In addition, the terms "first" and "second" are only used for descriptive purposes, and cannot be understood as indicating or implying relative importance or implicitly indicating the number of technical features indicated. Therefore, the features defined with "first" and "second" may explicitly or implicitly include one or more of these features. In the description of the present application, "multiple" means two or more, unless otherwise specifically defined.

In the present application, unless otherwise clearly specified and limited, the terms "installed", "connected with", "connect" and other terms should be interpreted broadly. For example, "connect" may be a fixed connection, a detachable connection, or an integrated connection. For those skilled in the art, the specific meanings of the above terms in the present application may be understood according to specific cases.

Although the embodiments of the present application have been shown and described above, it can be understood that the embodiments described above are exemplary and should not be understood as limitations to the present application. For those skilled in the art, many modifications, variations, equivalent replacements and improvements may be made to the above embodiments within the protection scope of the present application.

What is claimed is:

1. A consequent-pole motor, comprising:
   a rotor comprising a plurality of permanent magnet poles evenly spaced along a circumferential direction of the rotor; and
   a stator sleeved outside the rotor, a plurality of stator teeth being disposed on an inner periphery of the stator along a circumferential direction of the inner periphery,
   wherein a permanent magnet pole of the rotor comprises a first permanent magnet mounting groove and a second permanent magnet mounting groove disposed sequentially from outside to inside along a radial direction of the rotor, a first layer permanent magnet is disposed in the first permanent magnet mounting groove, and a second layer permanent magnet is disposed in the second permanent magnet mounting groove,
   wherein a q-axis of the consequent-pole motor passes through the second permanent magnet mounting groove, the q-axis is located between the first permanent magnet mounting groove and a second permanent magnet mounting groove of a target permanent magnet pole in the plurality of permanent magnet poles, and the target permanent magnet pole is adjacent to the permanent magnet pole,
   wherein on a section perpendicular to an axis of the rotor, both sections of the first permanent magnet mounting groove of the permanent magnet pole and the second permanent magnet mounting groove of the permanent magnet pole comprise a first segment, a second segment and a third segment connected in sequence, the first segment and the third segment are symmetrical about a midline of the second segment, and the q-axis passes through the second segment of the second permanent magnet mounting groove of the permanent magnet pole,
   wherein a consequent-pole is disposed between two adjacent permanent magnet poles.

2. The consequent-pole motor according to claim 1, wherein a thickness of the first layer permanent magnet is t1, a thickness of the second layer permanent magnet is t2, and 1.3<t1/t2<1.7.

3. The consequent-pole motor according to claim 1, wherein at least one of the first layer permanent magnet and the second layer permanent magnet comprises a plurality of permanent magnet blocks.

4. The consequent-pole motor according to claim 1, wherein on a section perpendicular to an axis of the rotor, a section of the second layer permanent magnet is in a shape of V.

5. The consequent-pole motor according to claim 1, wherein on a section perpendicular to an axis of the rotor, a section of the second layer permanent magnet is in a shape of line.

6. The consequent-pole motor according to claim 1, wherein the q-axis does not pass through the first permanent magnet mounting groove.

7. The consequent-pole motor according to claim 1, wherein a shape of the q-axis is a straight line, the q-axis is located between the third segment of the first permanent magnet mounting groove of the permanent magnet pole and the third segment of the second permanent magnet mounting groove of the permanent magnet pole, and the third segment of the first permanent magnet mounting groove of the permanent magnet pole and the third segment of the second permanent magnet mounting groove of the permanent magnet pole are located at a same side of the midline of the second segment.

8. The consequent-pole motor according to claim 1, wherein the number of the stator teeth is z and the number of the permanent magnet poles is p, the first permanent magnet mounting groove of the permanent magnet pole is corresponding to a first area of the inner periphery of the stator, and the number of the stator teeth in the first area is z/4p+1.

9. The consequent-pole motor according to claim 8, wherein the second permanent magnet mounting groove of the permanent magnet pole is corresponding to a second area of the inner periphery of the stator, and the number of the stator teeth in the second area is z/2p+2.

10. The consequent-pole motor according to claim 1, wherein the number of the stator teeth is z and the number of the permanent magnet poles is p, the second permanent magnet mounting groove of the permanent magnet pole is corresponding to a second area of the inner periphery of the stator, and the number of the stator teeth in the second area is z/2p+2.

11. The consequent-pole motor according to claim 10, wherein two tooth tips are respectively disposed on both sides of one end of each of the stator teeth close to the rotor, one side of the second permanent magnet mounting groove is corresponding to an outer tooth tip of a stator tooth on one side of the second area, and the other side of the second permanent magnet mounting groove is corresponding to an outer tooth tip of a stator tooth on the other side of the second area.

12. The consequent-pole motor according to claim 1, wherein the first layer permanent magnet is a permanent magnet with low remanence and low coercivity.

13. The consequent-pole motor according to claim 12, wherein the second layer permanent magnet is a permanent magnet with high remanence and high coercivity.

14. The consequent-pole motor according to claim 1, wherein midlines of the second segments of the first permanent magnet mounting groove and the second segment of the second permanent magnet mounting groove are coincident and intersect the axis of the rotor.

15. The consequent-pole motor according to claim 14, wherein the first layer permanent magnet is disposed in the second segment of the first permanent magnet mounting groove, and a magnetic insulating material is provided in the first segment and the third segment of the first permanent magnet mounting groove; and
the second layer permanent magnet is provided in the second segment of the second permanent magnet mounting groove, and a magnetic insulating material is provided in the first segment and the third segment of the second permanent magnet mounting groove.

16. The consequent-pole motor according to claim 14, wherein a thickness of the first layer permanent magnet is t1, a thickness of the second layer permanent magnet is t2, a distance between one end of the first segment of the second permanent magnet mounting groove close to an outer periphery of the rotor and one end of the third segment of the second permanent magnet mounting groove close to the outer periphery of the rotor is w2, and 4<w2/(t1+t2)<8.

17. The consequent-pole motor according to claim 14, wherein a minimum distance between the first segment of the first permanent magnet mounting groove and an outer periphery of the rotor is t3, a minimum distance between the third segment of the first permanent magnet mounting groove and the outer periphery of the rotor is t3, a minimum distance between the first segment of the second permanent magnet mounting groove and the outer periphery of the rotor is t4, a minimum distance between the third segment of the second permanent magnet mounting groove and the outer periphery of the rotor is t4, and t3≥t4.

18. The consequent-pole motor according to claim 14, wherein a minimum distance between a center of the first layer permanent magnet and an outer periphery of the rotor is tm1, a distance between one end of the first segment of the first permanent magnet mounting groove close to an outer periphery of the rotor and one end of the third segment of the first permanent magnet mounting groove close to the outer periphery of the rotor is w1, a distance between one end of the first segment of the second permanent magnet mounting groove close to the outer periphery of the rotor and one end of the third segment of the second permanent magnet mounting groove close to the outer periphery of the rotor is w2, and (2×tm1)/(w2−w1)=(0.5~1).

19. The consequent-pole motor according to claim 14, wherein a distance between one end of the first segment of the first permanent magnet mounting groove close to an outer periphery of the rotor and one end of the third segment of the first permanent magnet mounting groove close to the outer periphery of the rotor is w1, a distance between one end of the first segment of the second permanent magnet mounting groove close to the outer periphery of the rotor and one end of the third segment of the second permanent magnet mounting groove close to the outer periphery of the rotor is w2, and 1.15<w2/w1<2.1.

20. The consequent-pole motor according to claim 14, wherein the first segment of one of two adjacent second permanent magnet mounting grooves is adjacent to the third segment of the other, a distance between one end of the first segment of one of the two adjacent second permanent magnet mounting grooves close to an outer periphery of the rotor and one end of the third segment of the other close to the outer periphery of the rotor is w3, a width of the second layer permanent magnet is wm2, and 1.8<wm2/w3<2.7.

* * * * *